UNITED STATES PATENT OFFICE.

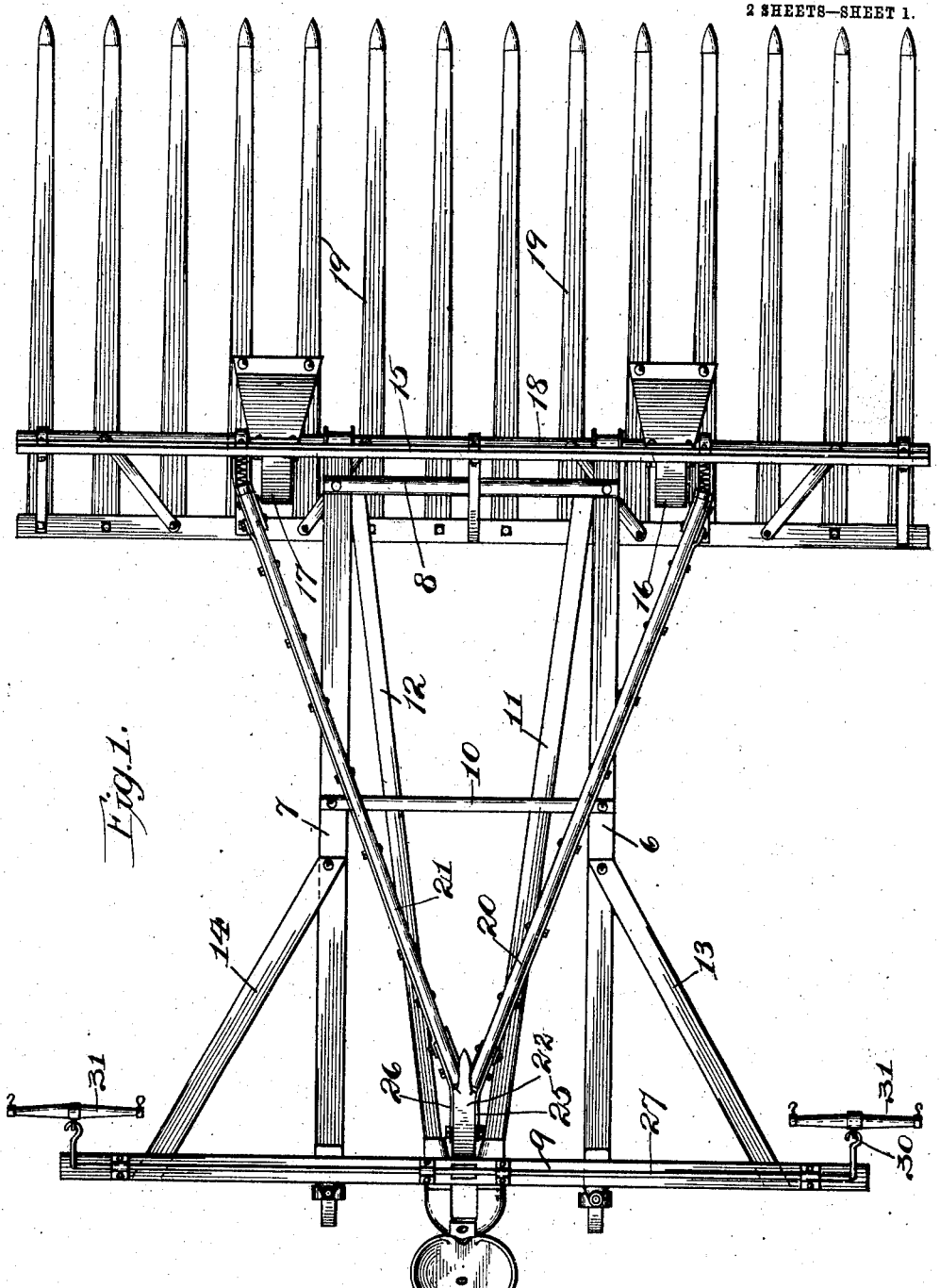

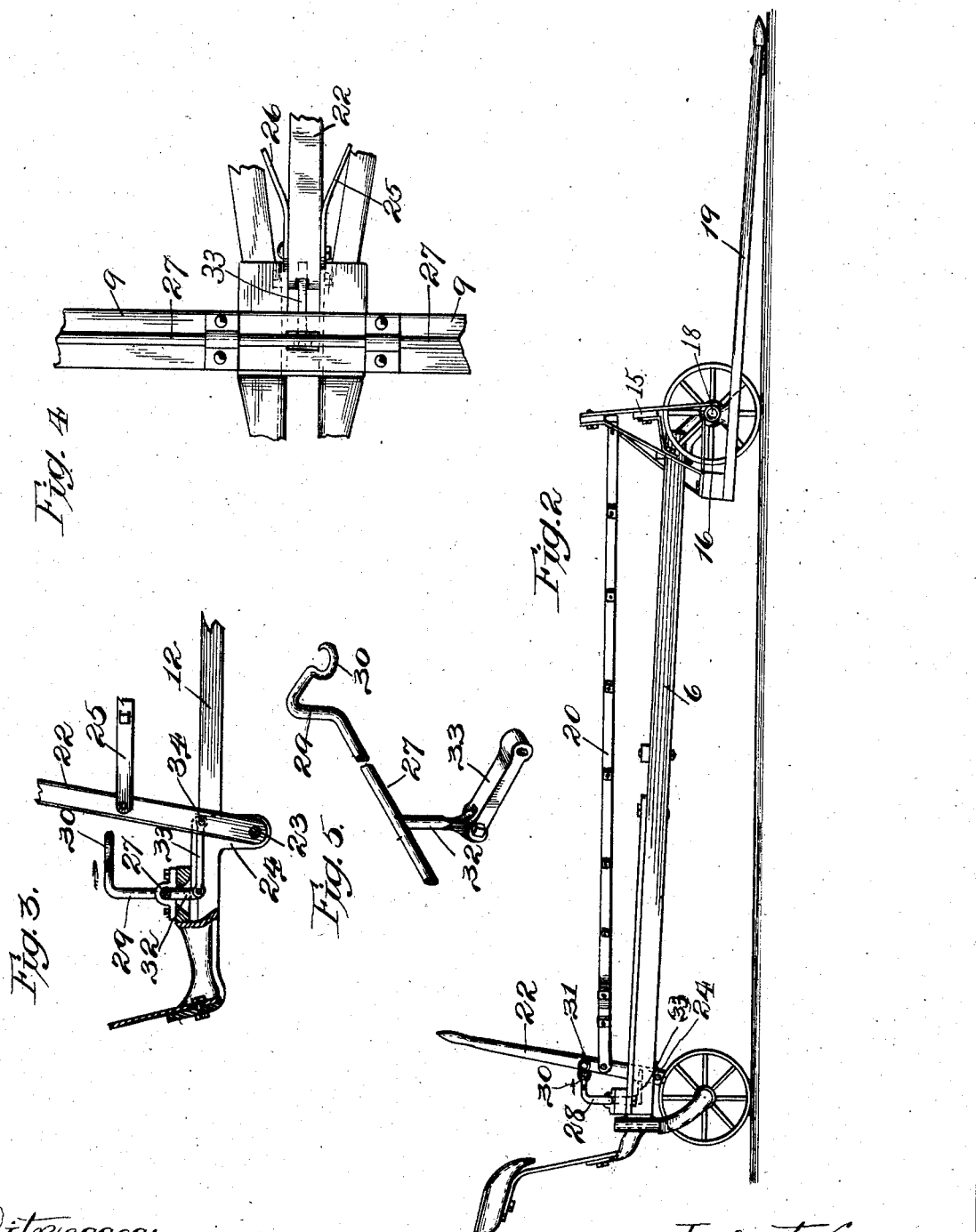

JOSEPH DAIN, OF OTTUMWA, IOWA.

HAY-RAKE.

No. 846,456. Specification of Letters Patent. Patented March 12, 1907.

Application filed April 16, 1904. Serial No. 203,395.

*To all whom it may concern:*

Be it known that I, JOSEPH DAIN, a citizen of the United States, residing at Ottumwa, in the county of Wapello and State of Iowa, have invented certain new and useful Improvements in Hay-Rakes, of which the following is a specification, reference being had to the accompanying drawings.

My invention relates to rakes, and has particularly to do with those of the type known as "push-rakes."

It has for its object to provide new and improved means for utilizing the draft of the team for raising the points of the rake-teeth from raking to carrying position. I accomplish this object as illustrated in the drawings and as hereinafter described.

What I regard as new is set forth in the claims.

In the accompanying drawings, Figure 1 is a plan view. Fig. 2 is a side elevation. Fig. 3 is an enlarged detail, some of the parts being in section. Fig. 4 is an enlarged partial plan view, and Fig. 5 is a perspective view, of certain parts of the machine.

My improved machine comprises a main frame or carriage supported on wheels and having at its forward end a swinging rake-head adapted to be rocked to adjust the points of the rake-teeth vertically. The rake-head is preferably of the construction illustrated and described in my application of even date herewith, Serial No. 202,393, to which reference is made for a full description thereof. So far as my present invention is concerned, however, said rake-head may be of any approved construction.

Referring to the drawings, 6 7 indicate the side bars of the main frame or carriage; 8, a front cross-bar; 9, a rear cross-bar, and 10 an intermediate cross-bar.

11 12 indicate braces which connect the forward and rear portions of the main frame. As shown in Fig. 1, the rear bar 9 extends a considerable distance beyond the side bars 6 7 and is braced thereto by braces 13 14.

15 indicates the rake-head, which is supported on wheels 16 17, journaled on a shaft 18, which forms a part of the rake-head.

19 indicates the rake-teeth.

20 21 indicate connecting-bars, commonly termed "pull-poles," which are connected with the end portions of the rake-head and converge back to a hand-lever 22, pivotally supported at the rear of the main frame, as best shown in Fig. 3, in which 23 indicates the pivot of said lever. As shown in said figure, said pivot is carried in a bracket-arm 24, which extends downward so as to bring the pivot 23 at a low point. Preferably the pull-poles 20 21 are connected to the lever 22 by straps 25 26; but other suitable connections may be employed.

27 indicates a rock-shaft mounted upon or otherwise suitably supported by the rear bar 9. Said rock-shaft is provided at or near its ends with arms 28 29, which normally stand in a substantially vertical position, as shown in Figs. 2 and 5. Said arms are connected by hooks 30 or other suitable means with swingletrees 31 or other equivalent draft connections, as shown in Fig. 1.

32 indicates an arm which extends down from the rock-shaft 27, preferably centrally thereof, and is connected by a connecting-rod 33 with the lever 22 at a point above its pivot, as shown at 34 in Fig. 3. (See also Fig. 5.)

By this construction when the draft is applied the shaft 27 is rocked, throwing the arm 32 to the rear, thereby swinging the lever 22 rearwardly and carrying with it the pull-poles 20 21. The result is that the rake-head 15 is rocked to raise the points of the rake-teeth. Instead of connecting the arm 32 with the lever 22 it may be connected with the pull-poles 20 21 in any other suitable manner. The hand-lever 22 serves to assist in raising the points of the rake-teeth and also serves as a means of depressing them when desired.

The parts are ordinarily so adjusted that the draft alone is not sufficient to raise the points of the rake-teeth out of operative position, the practice being to employ the hand-lever or some other equivalent means as a supplemental lifting device. When the hand-lever is released, therefore, the weight of the teeth restores them to operative position.

Having now described in detail the embodiment of my invention illustrated in the accompanying drawings, I wish it to be understood that my invention is not restricted to the details of the construction described, except in so far as they are particularly claimed, but includes, generically, the subject-matter of the broader claims.

That which I claim as my invention, and desire to secure by Letters Patent, is—

1. In a rake, the combination of a frame, a rake-head pivotally mounted at the front thereof, a lever connected with said rake-head for rocking the same, a transverse shaft for rocking said rake-head, and draft mechanism connected with said transverse shaft for actuating the same by the draft of the team to rock the rake-head.

2. In a rake, the combination of a frame, a rake-head pivotally mounted at the front thereof, a lever connected with said rake-head for rocking the same, a transverse shaft for rocking said rake-head, draft mechanism connected with said transverse shaft for actuating the same by the draft of the team to rock the rake-head, and means connecting said shaft and lever.

3. In a rake, the combination of a main frame, a rake-head pivotally supported at the forward portion thereof, a rock-shaft, a lever, means connecting said lever, the rock-shaft and said rake-head, whereby the rake-head may be rocked by power applied initially to said lever or to said rock-shaft, and draft mechanism connected with said rock-shaft.

4. In a rake, the combination of a main frame, a rake-head pivotally supported at the forward portion thereof, a rock-shaft extending transversely of said frame, means connecting said rock-shaft with said rake-head whereby by rocking said shaft the points of the rake-teeth may be moved vertically, one or more arms carried by said rock-shaft, and draft apparatus connected with said arm or arms for rocking the same.

5. In a rake, the combination of a main frame, a rake-head pivotally supported at the forward portion thereof and adapted to be rocked to vertically move the rake-teeth, a rock-shaft at the rear portion of said frame and extending transversely thereof, draft devices connected with the end portions thereof, for rocking the same, and means connecting said rock-shaft with said rake-head and acting to rock the same when draft is applied to said draft devices, substantially as described.

6. In a rake, the combination of a main frame, a rake-head pivotally supported in the forward portion thereof, a rock-shaft, a lever means connecting said rock-shaft with said lever, means connecting said lever with said rake-head, and draft devices connected to said rock-shaft for rocking the same by the draft of the team, substantially as described.

7. In a rake, the combination of a main frame, a rake-head pivotally supported at the forward portion thereof, a rock-shaft mounted on said frame and extending transversely thereof, draft devices connected at opposite sides of the machine with said rock-shaft at one side of the axis thereof, and means connecting the intermediate portion of said rock-shaft at the opposite side of the axis thereof with the upper portion of said rake-head, whereby the application of the draft to said rock-shaft will operate to raise the points of the rake-teeth, substantially as described.

8. In a rake, the combination of a main frame, a rake-head pivotally supported at the forward portion thereof, a rock-shaft mounted on said frame, draft devices connected with said rock-shaft at one side of the axis thereof, a lever mounted on said frame, means connecting said lever with said rock-shaft at the opposite side of the axis thereof, and means connecting said lever with said rake-head, substantially as described.

9. In a rake, the combination of a main frame, a rake-head pivotally supported at the forward portion thereof, a rock-shaft mounted on said frame, draft devices connected with said rock-shaft at one side of the axis thereof, a lever pivotally mounted at its lower end upon said frame, means connecting said lever at a point above its pivot with said rock-shaft at a point below the axis thereof, and means connecting said lever with the rake-head, substantially as described.

JOSEPH DAIN.

Witnesses:
C. A. LASSER,
J. D. BROWNING.